Jan. 27, 1953 J. D. HOWELL 2,626,799
PRESTRESSED SPRING
Filed Aug. 16, 1946 2 SHEETS—SHEET 1
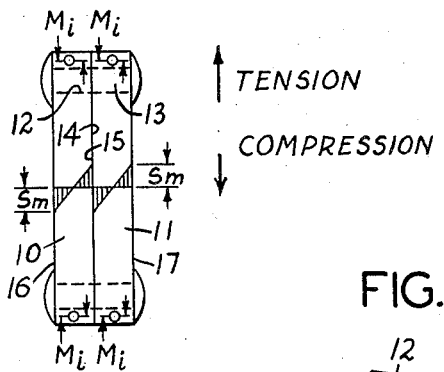
FIG. 2.
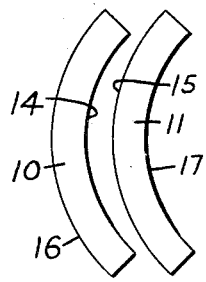
FIG. 1.
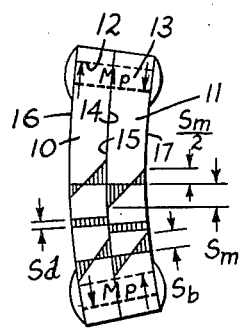
FIG. 3.
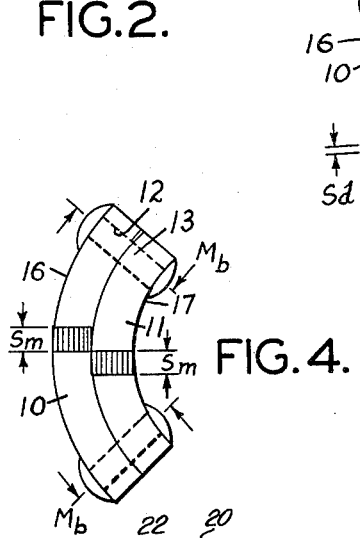
FIG. 4.
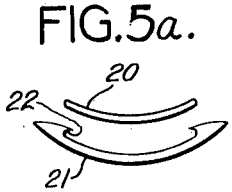
FIG. 5a.
FIG. 5b
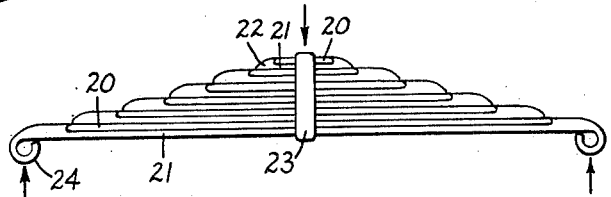
FIG. 5.
INVENTOR.
JOHN D. HOWELL
BY John P. Chandler
his ATTORNEY.

Jan. 27, 1953  J. D. HOWELL  2,626,799
PRESTRESSED SPRING

Filed Aug. 16, 1946  2 SHEETS—SHEET 2

INVENTOR.
JOHN D. HOWELL
BY John P. Chandler
his ATTORNEY.

Patented Jan. 27, 1953

2,626,799

UNITED STATES PATENT OFFICE 2,626,799

PRESTRESSED SPRING

John D. Howell, Westport, Conn.

Application August 16, 1946, Serial No. 691,059

6 Claims. (Cl. 267—47)

This invention relates to springs, and relates more particularly to an improved spring which has set up therein a controlled amount of initial stress. The invention further relates to a novel method of forming a pre-stressed spring of novel construction.

An important object of the present invention is to provide a spring of this character which may have resilience or energy storage capacity equal to more than two times that of a spring of comparative size and weight not so pre-stressed.

The method of the present invention is applicable to springs stressed by bending in such a manner that the bending moment is constant over the length of a spring element, such as leaf springs, helical torsion springs, spiral torsion springs, clock or motor springs, and others. It is also applicable, under certain conditions to be described, to springs stressed by bending when the bending moment is not constant over the length of an element, such as a cantilever spring.

Another object of the invention is to provide an improved, pre-stressed spring which is capable of performing more useful work than a common spring of equivalent size, or which may be made smaller and accordingly occupy a smaller space if only a given amount of energy is required to accomplish a desired result. These considerations are particularly important since springs find great usefulness in devices of a portable nature wherein space is almost invariably a consideration. Even in many permanent installations, including machines, springs perform many functions, and to reduce their size by more than one-half or increase their energy by more than two times is greatly desired.

In accordance with the present invention a plurality of spring elements are superimposed, one upon the other. Prior to assembly each of the spring elements is performed to assume a contour approximately that which it will assume when it is fully loaded. As an example, the spring elements which are of similar size and shape, and which may be initially cut from flat stock, are first formed to assume an arcuate shape. In assembly they may be flexed to again assume a generally flat contour, and while retained in such position under stress are secured together at opposite ends by properly designed terminal connections, such as bolts or rivets, or by means of welding. When released the laminated spring assumes a contour between the initial arcuate contour and the flat contour. The several factors are so chosen as to cause the laminated spring to assume, when fully loaded, a contour generally the same as that of the preformed, unassembled individual elements. As compared with a single spring element of the same size and weight as the two spring elements so formed, the former will have energy storage capacity equal generally to two and one-quarter times the latter.

In the drawings:

Fig. 1 is a side elevation of two spring elements in their preformed, unassembled state.

Fig. 2 shows the relation of the parts during assembly.

Fig. 3 shows the spring released after assembly.

Fig. 4 shows the spring under full load.

Fig. 5 illustrates the present invention as applied to one type of leaf spring.

Fig. 5a is a side elevation of two of the spring elements employed in the spring of Fig. 5 in their preformed unassembled shape.

Fig. 5b illustrates the two elements assembled and still in the contour to which they are flexed for assembly.

Figure 6:
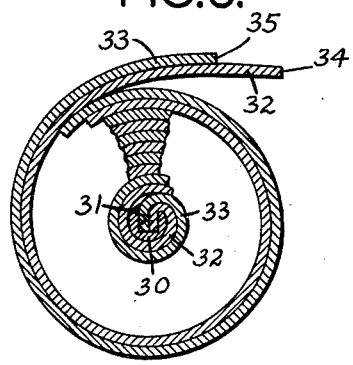
Fig. 6 illustrates the first step in forming a spiral or motor spring embodying the present invention.

The two spring elements 10 and 11 shown in Fig. 1, which are of similar size and shape, may first be preformed to assume, when at rest, substantially the contour shown. These elements are then superimposed and bent to the flat contour shown in Fig. 2. This sets up bending stresses varying across the cross section from $S_m$ in compression at one side of an element to $S_m$ in tension at the other, where, by the well known formula for stress due to bending, $$S_m = \frac{M_i t}{2I} = \frac{6M_i}{bt^2}$$

$t$ = thickness of element.
$b$ = width of element.
$I = \frac{bt^3}{12}$ = moment of inertia of cross section.
$M_i$ = initial bending moment.

While under this stress, the elements are connected together at their ends, as by drilling apertures 12 and inserting therein headed rivets 13, thus holding the respective inner surfaces 14 and 15 of the elements in contact with each other. When so connected, the forces which produced the flat contour of Fig. 2 may be released and the assembled spring will assume generally the contour shown in Fig. 3. Inasmuch as the ends are rigidly connected together and the stresses on the adjacent faces of the spring elements are of equal magnitude, but opposite in direction, the spring elements along their surfaces of contacts 14 and 15, respectively, will not change in length and consequently in stress. With the release of the initial bending moment $M_i$, however, the stresses set up will tend to bend the assembly so as to relieve the stresses on the outer surfaces 16 and 17, respectively. In other words, since the inner surface 15 of spring element 11 tries to lengthen and the adjacent surface 14 of spring element 10 tries to shorten, they nevertheless remain in balance as a result of the terminal connections. The outer surfaces 16 and 17, however, are not so secured together so their respective lengths can change.

Due to the end connections this bending will be resisted by a couple produced by the stretching of one element and the compression of the other. Accordingly, when a position of equilibrium is reached, the stress distribution will be that shown in the uppermost stress diagram of Fig. 3. This may be considered the algebraic sum of the two lower distributions—on element 10 a direct tensile stress $S_d$ constant across the cross section and a bending stress ranging from $S_b$ compression to $S_b$ tension, and on element 11 a direct compressive stress $S_d$ constant across the same bending stresses as on element 10. Therefore, $$S_m = S_b + S_d$$

Due to equilibrium, the moments $M_s$ due to the bending stresses must equal the moment $M_p$ due to the direct tensile and compressive stress.

$$M_p = 2M_s$$
$$M_p = S_d b t^2$$
$$M_s = \frac{S_b b t^2}{6}$$

Therefore $$3S_d = S_b, \text{ and } S_d = \frac{S_m}{4}$$

The stress on the outer surfaces will be $$S_b - S_d = 2S_d = \frac{S_m}{2}$$

Fig. 4 shows the spring under a bending moment $M_d$ which will produce a stress $S_m$ in the outer surfaces 16 and 17 of the spring. As the stresses in the contacting surfaces 14 and 15 are still $S_m$, a constant stress $S_m$ will be obtained in tension across left spring element 10 and in compression across right spring element 11, and the value of $M_b$ will be $$M_b = S_m b t^2$$

Assuming, then, $S_m$ to be a maximum allowable stress, the maximum allowable moment $M_{b1}$ for a one-piece bar of the same cross section, i. e., thickness=$2t$, width=$b$, would be $$M_{b1} = \frac{2}{3} S_m b t^2$$

It will be apparent from the foregoing that this laminated spring would sustain 1.5 times the bending moment of a one-piece spring. Also, as the outer fibre stress in the pre-stressed spring varies from $$\frac{S_m}{2}$$

in tension or compression to $S_m$ in compression or tension, respectively, it produces a strain of $1\frac{1}{2}$ $e_m$, while in the one-piece spring, as the outer stress varies from zero to $S_m$, the strain produced is only $e_m$. The pre-stressed spring of the present invention, therefore, will permit 1.5 times the deflection of a one-piece spring. As the resilience of a spring is proportional to the product of the load or moment and the deflection, the pre-stressed spring of the present invention has $1.5^2$ or 2.25 times the resilience of the one-piece spring. It should be noted that this is ¾ the resilience of a straight bar of the same volume or weight in tension, which, though generally considered the most efficient spring, is little used because of its usually inconvenient proportions.

In Fig. 5 one type of leaf spring embodying the present invention is illustrated. It consists of a plurality of pairs of superimposed spring elements 20 and 21, the former being in compression and the latter being in tension. In this case the terminals of the spring elements 20 and 21 are not bolted, or welded together, as suggested in the spring of Figs. 1 to 4, inclusive, but on the contrary tension spring element 21 is provided with hook-shaped terminals 22 which receive and support the opposite terminals of upper or compression spring element 20.

Fig. 5 shows the assembled laminated leaf spring at rest and not under load. Fig. 5a shows the initial contour of two of the spring elements 20 and 21 in a position of rest and prior to assembly. Accordingly, this showing corresponds to the showing on Fig. 1 in the first embodiment of the invention. To assemble the spring elements, both elements are flexed to the contour shown in Fig. 5b and element 20 is moved sidewise into engagement with hook-shaped terminals 22 of element 21. It will be understood that the length of element 20 has been previously controlled to fit into hook-shaped elements 22 as exactly as possible when the two elements have this contour. Upon release of the elements from this contour, they will assume the flat contour shown in Fig. 5. This release of the bending stress on the elements causes the hook-shaped terminal 22 to put the element 20 under compression and accordingly to put the element 21 under tension. The relationship of the length of each pair of superimposed spring elements is such that the length of each lower spring element 21 is of substantially the same length or only slightly shorter than the length of the next downwardly-disposed compression spring element 20. When the several pairs of spring elements have been assembled in the manner described, they may be clamped together by means of a clamping element 23, and the lowermost tension element 21 may be provided with rings or other connecting portions 24.

In the first embodiment of the invention, the assembled spring as shown in Fig. 3 assumes a slightly concave contour on the compression side when at rest whereas in the spring of Fig. 5 the spring has a flat contour when at rest. The same principal may be applied to a spring which will be convex on the compression side when at rest or even under load although in this case it may be necessary to provide means for preventing the separation of the elements due to buckling of the compression element. Such means is shown at 23 in Fig. 5.

Figure 7:
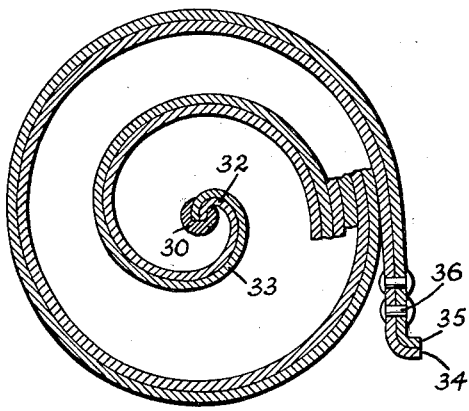
Fig. 7 illustrates the second step in forming such spring.
Figure 8:
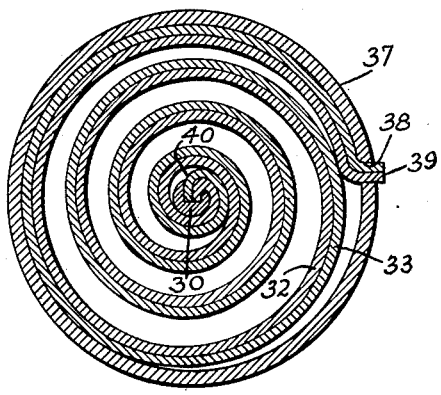
Fig. 8 is a section showing the finished spring.

The spring illustrated in Figs. 6, 7 and 8 is of the spiral type and may be used for spring motors or other similar devices. In forming this spring a mandrel 30 is provided with a recess 31 which receives and secures the previously connected inner ends of the inner and outer spring elements 32 and 33, respectively. Such connection may be effected by spot welding, by rivets or by any other suitable means. These are long, flat springs which are wound tightly about the mandrel. If the two spring elements are initially of the same length, the outer terminal 34 of the inner spring element 32 will extend beyond the outer terminal 35 of the outer spring element 33. While retained in this tightly wound condition, the spring elements are heat treated to remove all stresses, which is the preforming operation in a spring of this character and corresponds generally to the step illustrated in Fig. 1.

The step corresponding to the step illustrated in Fig. 2 is shown in Fig. 7, which consists in unwinding the spring. This can be done in a variety of ways, but it is best accomplished by securing the outer terminals 34 and 35 within a drum of larger internal diameter than the tightly coiled spring, and then rotating the mandrel 30 in a clockwise direction when viewed as in Fig. 7. As this proceeds, outer terminals 34 and 35 of the spring elements will approach each other, and when the spring is fully unwound within the limits of the drum such terminals may be spot welded or otherwise secured together, as shown at 36. The spring may now be inserted within a spring drum 37 which is provided with an opening 38 for the outer terminal 39 of the laminated spring. The inner terminal 40 of the laminated spring is still secured within the mandrel 30.

Figure 9:
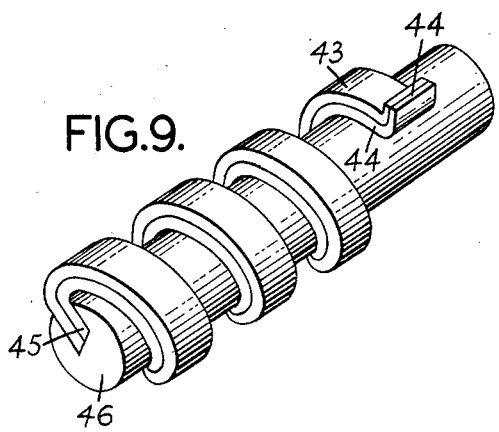
Fig. 9 is a perspective view illustrating a helical torsion spring constructed in accordance with the present invention.

Fig. 9 illustrates a helical torsion spring 42 which may be formed in substantially the same manner as that just described in connection with Figs. 6 to 8 except that the spring is formed as a helix instead of a spiral, and includes an outer lamination 43 and an inner lamination 44. It is secured at one end thereof, as at 45, to a mandrel 46. The outer terminal 44 may be suitably connected to the element (not shown) which is to be driven by the spring.

Where the bending moment is not constant thruout the length of the spring element, as in the simple cantilever spring, there will be produced a shear tending to cause sliding between the elements at their contacting surfaces. Unless prevented, this sliding will cause an incorrect distribution of the pre-stress along the length of the spring. Where, however, suitable means of fastening the elements together over their full contacting surfaces are available, as by cementing together wood or plastic spring elements, or even metal spring elements, the previously described method of pre-stressing may be used for springs loaded so as to procure a non-constant bending moment.

While three forms or embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A prestressed spring formed from a pair of elongated spring elements of generally similar contour, each of such spring elements being shaped to assume, when unassembled and at rest, substantially the contour they occupy when under the maximum allowable load, and means connecting the adjacent terminals of the spring elements together while they are flexed in a direction opposite to that in which they will be flexed when under load.

2. A prestressed spring comprising a pair of similarly-shaped spring elements, each of the spring elements being shaped, before assembly, to assume generally the same contour as they occupy when under full load, and means rigidly securing the elements together adjacent their opposed terminals while they occupy a contour which will produce a bending stress on the outer faces of the elements substantially equal to but in the opposite sense to that which will be produced when they are under maximum allowable load.

3. A prestressed spring comprising a pair of superimposed spring elements and means securing the adjacent terminals of the spring elements together while they are under bending stress, the spring elements having a shape, when at rest and unassembled, corresponding generally to the contour they occupy when under full load, and being flexed through and past their position when at rest and assembled when they are so secured together.

4. A prestressed spring comprising a pair of superimposed, generally flat, elongated spring elements of substantially the same shape, such elements having a contour when at rest and unassembled corresponding generally to the contour they assume when under maximum allowable load, and means securing such elements together adjacent their opposed terminals while under a bending stress in a direction opposite to that in which they will be flexed when under load.

5. A prestressed, laminated spring formed from a plurality of spring elements of generally the same size, shape and contour, means securing the adjacent terminals of the spring elements together while under stress produced by bending in a direction opposite to that which they will assume when fully loaded, such spring elements being initially shaped to assume substantially the contour they will occupy when so fully loaded.

6. A prestressed, laminated spring formed from a plurality of superimposed spring elements, such elements being initially shaped to assume, when at rest and unassembled, substantially the contour they will occupy when fully loaded, and means securing the adjacent terminals of the spring elements together while they are flexed in a direction opposite to that in which they will be flexed when under load.

JOHN D. HOWELL.

REFERENCES CITED

The following references are of record in the file of this patent:

UNITED STATES PATENTS

| Number | Name | Date |
|---|---|---|
| 301,963 | Clayton | July 15, 1884 |
| 489,321 | Mowry | Jan. 3, 1893 |
| 1,546,896 | Herbert | July 21, 1925 |
| 1,577,767 | Smith | Mar. 23, 1926 |
| 1,590,211 | Simons | June 29, 1926 |
| 1,672,513 | Baird | June 5, 1928 |
| 1,818,040 | Carteret | Aug. 11, 1931 |
| 1,847,125 | Masury | Mar. 1, 1932 |
| 2,144,915 | Derby | Jan. 24, 1939 |